March 31, 1964  H. GRANLUND  3,127,201
TUBULAR RIVET CONNECTION
Filed Jan. 3, 1961

INVENTOR
HÅKON GRANLUND

Watson, Cole, Grindle & Watson
ATTORNEYS

United States Patent Office 3,127,201
Patented Mar. 31, 1964

3,127,201
TUBULAR RIVET CONNECTION
Håkon Granlund, Uranienborgveien 25, Oslo, Norway
Filed Jan. 3, 1961, Ser. No. 80,328
Claims priority, application Norway Jan. 4, 1960
1 Claim. (Cl. 287—20.3)

This invention relates to improved tubular rivet connections for securing one member, e.g. a wooden plate, to another member such as a tube.

Up till now such connections have been made by passing a tubular rivet through the wooden plate and one wall of the tube, with the head of the rivet in engagement with the surface of the wooden plate remote from the tube, the tightening of the rivet connection being effected by expansion of the end of the hollow rivet stem in any suitable manner, e.g. by means of an expansion mandril or otherwise suitable expansion member, so as to make the rivet engage the inner surface of the tube wall. When, in such cases, the wooden plate is upholstered, the tubular rivet has usually been passed also through the upholstery material, with the consequence that the surface of the upholstered plate thus secured to the tube will be rendered uneven and unpleasant in appearance.

It is a general desire to provide an invisible rivet connection and an upholstery surface which is even and more pleasant in appearance, even when the upholstery is applied prior to effecting the rivet connection, and to this effect it has been suggested to pass the rivet from the opposite side of the tube relative to the upholstered plate through both walls of the tube and through the wooden plate. But even in this case the end of the rivet stem will project into the upholstery material with the possibility of damaging the latter and/or making the surface of the upholstery uneven and unpleasant in appearance.

The expansion of the hollow rivet stem must be effected in such a manner that the expanded portion of the stem engages a hard material, such as steel, as correct expansion is difficult to effect in a soft material such as wood, and as the connection otherwise will not be durable.

According to the present invention the above disadvantages and deficiencies are remedied by providing a tubular rivet connection which in addition to the tubular rivet known per se, comprises a tightening bushing made of hard material such as steel, in which bushing the tubular rivet is expanded, the internal diameter of said bushing corresponding to the required external diameter of the rivet end after expansion of the latter.

The end of the tightening bushing through which the tubular rivet is inserted is conveniently made with a reduced diameter, the diameter of the opening corresponding to the diameter of the tubular rivet in not expanded condition. Further, it may be convenient to provide the opposite end of the bushing with securing means, such as a radially outwardly directed flange, corrugations, knurls or the like for the purpose of providing a better fastening of the bushing in a wooden plate.

The invention is illustrated by means of examples in the accompanying drawing, in which.

In the drawing similar parts are provided with the same reference number.

Figure 1:
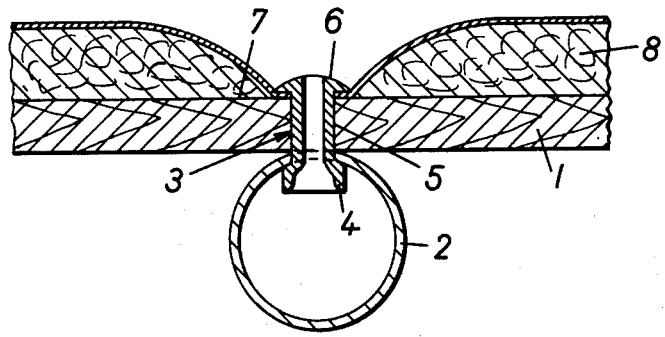
FIG. 1 is an axial sectional view through a tubular rivet connection of known type.

FIG. 1 illustrates a previously known manner of securing a member such as a wooden plate 1 to a tube 2 by means of a tubular rivet 3, the rivet 3 being passed through the plate 1 and one wall of the tube 2 and tightened by expanding the end 4 of the hollow rivet stem 5 in a manner known per se, e.g. by means of an expansion mandril or other suitable expansion member obvious to those skilled in the art. The head 6 of the rivet then engages the surface 7 of the plate 1 as shown, or may be countersunk in the plate. Further, the plate 1 may be, as shown, provided with upholstery material 8, and in this case the rivet 3 is passed through the upholstery 8 and thereafter through the plate 1 and the wall of the tube 2 as above. The surface of the upholstery will then be uneven and unpleasant in appearance and further, the upholstery will be easily damaged by the assembling and possible later disassembling of the connection.

Figure 2:
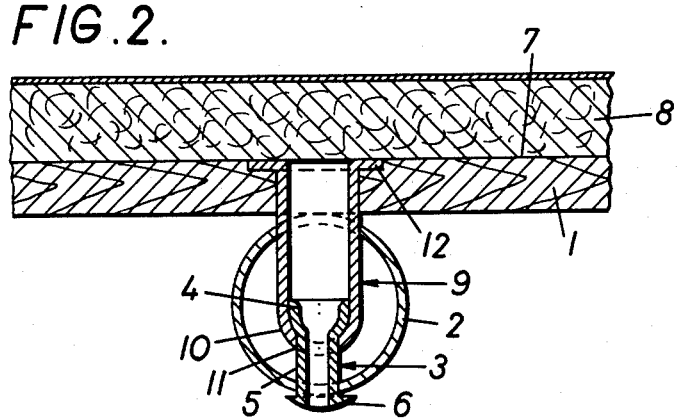
FIG. 2 is an axial sectional view through a tubular rivet connection in one embodiment of the invention.

In order to obtain a tubular rivet connection which will provide an even surface and improved appearance, the invention provides for a tightening bushing 9 of a hard material, in addition to the tubular rivet 3, such as shown by way of example in FIG. 2. At one end 10 of the bushing 9, the diameter is reduced so as to provide an opening 11 of smaller diameter than that of the remainder of the bushing, and in the other end the bushing may be provided with an outwardly directed flange 12. The bushing 9 is passed through the plate 1 and thereafter through one wall of the tube 2, the tubular rivet being passed through the opposite wall of the tube 2 and into the reduced diameter opening 11 of the bushing 9 in which bushing the rivet is tightened in a known manner by means of an expansion mandril (not shown). When the plate 1, as shown in the drawing, is provided with upholstery 8 the bushing 3 is passed through the plate 1 prior to the application of the upholstery. In this manner the upholstery will obtain a surface which is even and pleasant in appearance and will not tend to be damaged. Conveniently, the flange 12 of the bushing 9 is countersunk in the plate 1 as shown in FIG. 2.

Figure 3:
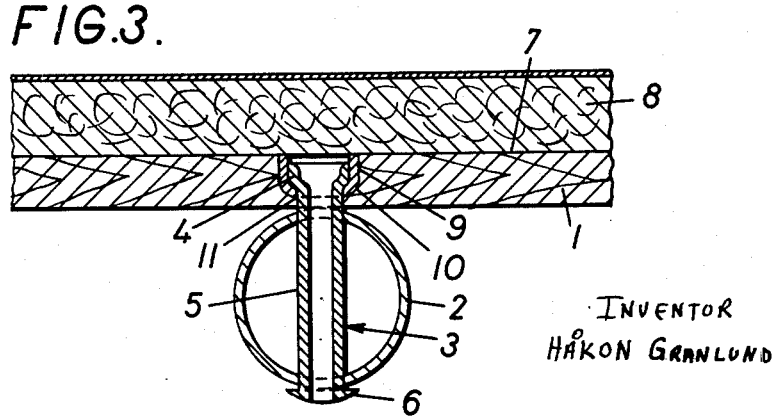
FIG. 3 is an axial sectional view through a tubular rivet connection in a modified embodiment of the invention.

FIG. 3 illustrates a modified embodiment of the tightening bushing according to the invention. The bushing 9 being made of hard material, is in the one end provided with a portion 10 with decreasing diameter so as to provide an opening 11 of smaller diameter than the remainder of the bushing. In this embodiment, the entire bushing 9 is countersunk in the plate 1, the portion 10 being nearer to the side of the plate 1 facing the tube 2. As in the examples shown the plate 1 may be provided with upholstery 8, the bushing 9 being mounted in the plate 1 prior to the application of the upholstery 8. The tubular rivet 3 is passed through both walls of the tube 2 and into the reduced diameter opening 11 of the bushing 9 in which the tubular rivet 3 is tightened in a known manner.

It will be understood that the above examples are indicative only and not meant to be restricting the scope of the invention.

I claim:

An interconnected assembly, comprising a first member provided with a through bore, a second tubular member engaging the said first member and provided with diametrically opposed holes in alignment with the said hole in the said first member, a tubular rivet provided with a head, a stem portion and an expanded stem end portion, and a tubular bushing formed member made of a material which is harder than that of the rivet and provided with an end portion of decreasing diameter with an opening, the diameter of which is substantially equal to that of the stem portion of the rivet and an interior surface supporting the expanded stem end portion of the rivet, the said tubular rivet and the said bushing member being arranged in axial and concentric alignment through the aligned holes of the said first and second mentioned members.

References Cited in the file of this patent

UNITED STATES PATENTS

| | | |
|---|---|---|
| 500,733 | Ashley | July 4, 1893 |
| 1,802,538 | Rych | Apr. 28, 1931 |
| 2,997,339 | Wilson | Aug. 22, 1961 |

FOREIGN PATENTS

| | | |
|---|---|---|
| 478,493 | France | Sept. 3, 1915 |